United States Patent
Chen et al.

(10) Patent No.: US 11,611,307 B2
(45) Date of Patent: Mar. 21, 2023

(54) SHORT-CIRCUIT FAULT-TOLERANT CONTROL METHOD BASED ON DEADBEAT CURRENT TRACKING FOR FIVE-PHASE PERMANENT MAGNET MOTOR WITH SINUSOIDAL BACK-ELECTROMOTIVE FORCE OR TRAPEZOIDAL BACK-ELECTROMOTIVE FORCE

(71) Applicant: JIANGSU UNIVERSITY, Zhenjiang (CN)

(72) Inventors: Qian Chen, Zhenjiang (CN); Yuhang Xia, Zhenjiang (CN); Licheng Gu, Zhenjiang (CN); Wenxiang Zhao, Zhenjiang (CN); Guohai Liu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/621,256

(22) PCT Filed: Dec. 7, 2020

(86) PCT No.: PCT/CN2020/134230
§ 371 (c)(1),
(2) Date: Dec. 21, 2021

(87) PCT Pub. No.: WO2022/088391
PCT Pub. Date: May 5, 2022

(65) Prior Publication Data
US 2022/0368269 A1  Nov. 17, 2022

(30) Foreign Application Priority Data
Oct. 27, 2020 (CN) .......................... 202011166421.3

(51) Int. Cl.
*H02H 7/08* (2006.01)
*H02P 29/028* (2016.01)
(Continued)

(52) U.S. Cl.
CPC ............ *H02P 29/028* (2013.01); *H02P 25/22* (2013.01); *H02P 29/67* (2016.11)

(58) Field of Classification Search
CPC ......... H02P 29/028; H02P 25/22; H02P 29/67
(Continued)

(56) References Cited

U.S. PATENT DOCUMENTS 6,017,354 A * 1/2000 Culp .................. A61B 17/1626
604/22
2012/0313564 A1   12/2012 Guitard et al.
(Continued)

FOREIGN PATENT DOCUMENTS

| CN | 104682807 A | 6/2015 |
| CN | 105958896 A | 9/2016 |

(Continued)

*Primary Examiner* — Erick D Glass
(74) *Attorney, Agent, or Firm* — Bayramoglu Law Offices LLC

(57) ABSTRACT

A short-circuit fault-tolerant control method based on deadbeat current tracking for a five-phase permanent magnet motor with a sinusoidal back-electromotive force or a trapezoidal back-electromotive force (EMF) is provided. By fully utilizing a third harmonic space of a five-phase permanent magnet motor in a fault state, the method proposes a fault-tolerant control strategy for a five-phase permanent magnet motor with a sinusoidal back-EMF or a trapezoidal back-EMF in case of a single-phase short-circuit fault. The method enables the five-phase permanent magnet motor to make full use of the third harmonic space during fault-tolerant operation, thereby improving the torque output of the motor in a fault state and improving the fault-tolerant operation efficiency of the motor. The method achieves (Continued)

desirable fault-tolerant performance and dynamic response of the motor, and expands the speed range of the motor during fault-tolerant operation.

8 Claims, 4 Drawing Sheets

(51) Int. Cl.
*H02P 29/60* (2016.01)
*H02P 25/22* (2006.01)

(58) Field of Classification Search
USPC .................................................. 318/400.21
See application file for complete search history.

(56) References Cited

U.S. PATENT DOCUMENTS

| | | | |
|---|---|---|---|
| 2014/0084833 A1* | 3/2014 | Aghili | H02P 25/22 318/453 |
| 2017/0047728 A1 | 2/2017 | Benarous et al. | |
| 2017/0244344 A1* | 8/2017 | Aghili | H02P 21/02 |
| 2019/0068107 A1* | 2/2019 | Mao | H02K 1/00 |

FOREIGN PATENT DOCUMENTS

| | | |
|---|---|---|
| CN | 107276492 A | 10/2017 |
| CN | 108964547 A | 12/2018 |
| CN | 109347386 A | 2/2019 |
| CN | 110518859 A | 11/2019 |

\* cited by examiner

SHORT-CIRCUIT FAULT-TOLERANT CONTROL METHOD BASED ON DEADBEAT CURRENT TRACKING FOR FIVE-PHASE PERMANENT MAGNET MOTOR WITH SINUSOIDAL BACK-ELECTROMOTIVE FORCE OR TRAPEZOIDAL BACK-ELECTROMOTIVE FORCE

CROSS REFERENCE TO THE RELATED APPLICATIONS

This application is the national phase entry of International Application No. PCT/CN2020/134230, filed on Dec. 7, 2020, which is based upon and claims priority to Chinese Patent Application No. 202011166421.3, filed on Oct. 27, 2020, the entire contents of which are incorporated herein by reference.

TECHNICAL FIELD

The present invention relates to the technical field of fault-tolerant control of multiphase motors, and in particular, to a single-phase short-circuit fault-tolerant control method for a five-phase permanent magnet motor, which is suitable for aerospace, electric vehicles, ship propulsion systems and other occasions that have high requirements on the reliability of the motor.

BACKGROUND

Five-phase permanent magnet motors have been widely used in electric vehicle traction, aerospace and marine cruise systems due to their high torque density, high efficiency and high reliability. A stable and reliable motor drive system is particularly important for aircraft and electric vehicles and other occasions with high reliability requirements. Therefore, the high-reliability fault-tolerant control methods of permanent magnet motors have received extensive attention.

In the five-phase permanent magnet motor, in addition to the third harmonic component artificially injected into the air gap magnetic field, the machining design error of the permanent magnet and the unsatisfactory magnetization will cause a certain third harmonic component in the air gap. For a five-phase permanent magnet motor with a third harmonic magnetic field, by injecting a specific proportion of third harmonic currents, the peak value of the air gap magnetic density can be effectively reduced, thereby improving the utilization of the core material and the output torque of the motor.

In recent years, domestic and foreign scholars have conducted in-depth research on the deadbeat model predictive control and short-circuit fault-tolerant control of multiphase motors, and have achieved plenty of results.

The commonly used deadbeat model predictive current control method can realize signal tracking. However, the existing research of this method focuses on the application under the normal running state of the motor, and there are few documents focusing on the deadbeat model predictive current control under the short-circuit state of the motor.

The research on the short-circuit fault-tolerant control algorithms of the multiphase motor focuses on the obtaining of the optimal fault-tolerant currents under the fault state of the motor. The existing fault-tolerant current calculation methods are summarized as follows. The short-circuit current model and the influence of the third harmonic back-electromotive force (EMF) on remedying the short circuit of the winding are analyzed, and an online optimal current reference generation technique is used. A cost function and a fixed frame control strategy are used in order to achieve optimal current control under the short circuit of a phase. The influence of the short-circuit current is eliminated to make the short-circuit model equivalent to an open-circuit model. However, these short-circuit fault-tolerant control strategies do not make full use of the third harmonic space of the five-phase motor, and mostly rely on the actual value of the back-EMF of the motor, which will cause errors.

SUMMARY

Traditional short-circuit fault-tolerant control does not make full use of the third harmonic space of the five-phase motor and depends on the actual back-electromotive force (EMF) of the motor, and the existing deadbeat model predictive current control fails to achieve fault-tolerant operation. In order to solve these problems, the present invention proposes a short-circuit fault-tolerant control method based on deadbeat current tracking for a five-phase permanent magnet motor with a sinusoidal back-EMF or a trapezoidal back-EMF.

To achieve the above objective, the present invention adopts the following technical solution.

A short-circuit fault-tolerant control method based on deadbeat current tracking for a five-phase permanent magnet motor with a sinusoidal back-EMF or a trapezoidal back-EMF includes the following steps:

step 1: detecting a speed of the five-phase permanent magnet motor as a feedback speed $\omega_m$ of the motor; comparing a given speed $\omega^*$ with the feedback speed $\omega_m$ to obtain a speed error $e_r$ of the motor; calculating, by a proportional integral (PI) controller, a q-axis current of the motor according to the speed error $e_r$; and outputting, by the PI controller, a given q-axis current $i_q$;

step 2: compensating a short-circuit current, and analyzing and processing a short-circuit fault as an open-circuit fault;

step 3: reconstructing reduced-order matrixes in a fundamental space and a third harmonic space under a single-phase short-circuit fault respectively;

step 4: ignoring a reluctance torque, and obtaining torque expressions of the motor under the short-circuit fault in the fundamental space and the third harmonic space through the reduced-order matrixes respectively;

step 5: constructing, for a five-phase permanent magnet motor with a sinusoidal back-EMF or a trapezoidal back-EMF, an expression of an extra torque ripple generated by an interaction of a short-circuit current and a short-circuit back-EMF;

step 6: generating, through the torque expressions in the fundamental space and the third harmonic space, short-circuit suppression currents $i_{d1s}$, $i_{q1s}$, $i_{z1s}$, $i_{d3s}$, $i_{q3s}$, and $i_{z3s}$ to offset the extra torque ripple caused by the short-circuit current, where $i_{d1s}$, $i_{q1s}$, and $i_{z1s}$ are short-circuit suppression currents in the fundamental space, and $i_{d3s}$, $i_{q3s}$, and $i_{z3s}$ are short-circuit suppression currents in the third harmonic space;

step 7: obtaining, for the five-phase permanent magnet motor with the sinusoidal back-EMF or the trapezoidal back-EMF, open-circuit fault-tolerant reference currents $i_{d1o}$, $i_{q1o}$, $i_{z1o}$, $i_{d3o}$, $i_{q3o}$, and $i_{z3o}$ to maintain a smooth output torque, through the q-axis current $i_q$ and the torque expressions in the fundamental space and the third harmonic space under the short-circuit fault, where $i_{d1o}$, $i_{q1o}$ and $i_{z1o}$ are open-circuit fault-tolerant reference currents in the fundamental space, and $i_{d3o}$, $i_{q3o}$, and $i_{z3o}$ are open-circuit fault-tolerant reference currents in the third harmonic space;

step 8: transforming the reference currents to maintain the stable output torque and the short-circuit suppression currents on $d_1$-$q_1$-$z_1$ axes in the fundamental space and $d_3$-$q_3$-$z_3$ axes in the third harmonic space into a natural coordinate system through coordinate transformation, and superposing the currents according to a superposition theorem; and transforming the currents integrated in the natural coordinate system to the $d_1$-$q_1$-$z_1$ axes through an inverse matrix of the reduced-order transformation matrix in the fundamental space, thereby forming optimal short-circuit fault-tolerant reference currents $i_{dr}$, $i_{qr}$ and $i_{zr}$;

step 9: constructing a discrete model for the five-phase permanent magnet motor with the sinusoidal back-EMF or the trapezoidal back-EMF under the short-circuit fault, and obtaining optimal fault-tolerant reference voltages $u_{dr}$, $u_{qr}$ and $u_{zr}$ under the short-circuit fault through deadbeat model predictive current control; and step 10: inputting the obtained optimal fault-tolerant reference voltages $u_{dr}$, $u_{qr}$ and $u_{zr}$ into a carrier-based pulse width modulation (CPWM) module through coordinate transformation to obtain switching signals of phases; and inputting the obtained switching signals into an inverter to control the motor, thereby realizing the short-circuit fault-tolerant control of the five-phase permanent magnet motor.

Further, in step 2, a reason for the analyzing and processing of a short-circuit fault as an open-circuit fault is as follows: when a short-circuit fault occurs, an influence of a fault phase on the motor is divided into two aspects: an influence of a loss of the fault phase on a torque output and an influence of a fault phase short-circuit current on the torque output; and when the influence of the fault phase short-circuit current on the torque output is offset, a short-circuit fault model is equivalent to an open-circuit fault model.

Further, in step 3, the reduced-order matrixes in the fundamental space and the third harmonic space are constructed by removing an element corresponding to a fault phase after a single-phase open-circuit fault occurs, and conducting reconstruction based on a principle that a circular trajectory of a flux linkage and the back-EMF of the motor remains unchanged in an $\alpha$-$\beta$ plane after the fault;

where, in case the motor with the sinusoidal back-EMF or the trapezoidal back-EMF has a phase-A open-circuit fault:

after an element corresponding to a phase A is removed, a matrix is obtained as follows:

$$T^A_{clarke} = \frac{2}{5}\begin{bmatrix} \cos\alpha & \cos2\alpha & \cos3\alpha & \cos4\alpha \\ \sin\alpha & \sin2\alpha & \sin3\alpha & \sin4\alpha \\ \cos3\alpha & \cos6\alpha & \cos9\alpha & \cos12\alpha \\ \sin3\alpha & \sin6\alpha & \sin9\alpha & \sin12\alpha \\ 1/2 & 1/2 & 1/2 & 1/2 \end{bmatrix}$$

where, $T^A_{clarke}$ is a clarke transformation matrix under a phase-A fault, and $\alpha=0.4\pi$;

in case of a fault, a first row and a third row of elements of the clarke transformation matrix are not orthogonal; in order to obtain the reduced-order transformation matrix in the fundamental space, the third row of elements of the matrix are removed; and based on the principle that the circular trajectory of the flux linkage and the back-EMF of the motor in the $\alpha$-$\beta$ plane remains unchanged after the fault, the matrix is reconstructed to obtain a reduced-order clarke transformation matrix and a reduced-order park transformation matrix in the fundamental space under the phase-A open-circuit fault:

$$T^A_{clarke1} = \frac{2}{5}\begin{bmatrix} \cos\alpha-1 & \cos2\alpha-1 & \cos3\alpha-1 & \cos4\alpha-1 \\ \sin\alpha & \sin2\alpha & \sin3\alpha & \sin4\alpha \\ \sin3\alpha & \sin6\alpha & \sin9\alpha & \sin12\alpha \\ 1/2 & 1/2 & 1/2 & 1/2 \end{bmatrix}$$

$$T^A_{park1} = \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix}$$

where, $T^A_{clarke1}$ is the reduced-order clarke transformation matrix in the fundamental space; $T^A_{park1}$ is the reduced-order park transformation matrix in the fundamental space; and $\theta$ is a position angle of a rotor.

in case of a fault, a first row and a third row of elements of the clarke transformation matrix are not orthogonal; in order to obtain the reduced-order transformation matrix in the third harmonic space, the first row of elements of the matrix are removed; and based on the principle that the circular trajectory of the flux linkage and the back-EMF of the motor in an $\alpha_3$-$\beta_3$ plane remains unchanged after the fault, the matrix is reconstructed to obtain a reduced-order clarke transformation matrix and a reduced-order park transformation matrix in the third harmonic space under the phase-A open-circuit fault:

$$T^A_{clarke3} = \frac{2}{5}\begin{bmatrix} \cos3\alpha-1 & \cos6\alpha-1 & \cos9\alpha-1 & \cos12\alpha-1 \\ \sin3\alpha & \sin6\alpha & \sin9\alpha & \sin12\alpha \\ \sin\alpha & \sin2\alpha & \sin3\alpha & \sin4\alpha \\ 1/2 & 1/2 & 1/2 & 1/2 \end{bmatrix}$$

$$T^A_{park3} = \begin{bmatrix} \cos3\theta & \sin3\theta & 0 & 0 \\ -\sin3\theta & \cos3\theta & 0 & 0 \\ 0 & 0 & 1 & 0 \\ 0 & 0 & 0 & 1 \end{bmatrix}$$

where, $T^A_{clarke3}$ is the reduced-order clarke transformation matrix in the third harmonic space; and $T^A_{park3}$ is the reduced-order park transformation matrix in the third harmonic space.

Further, in step 4, the torque expressions in the fundamental space and the third harmonic space are obtained by step 4.1: taking, for the motor with the trapezoidal back-EMF, a derivative of a magnetic co-energy to a mechanical angle in case of a constant current; and ignoring the reluctance torque, and obtaining the torque expressions of the motor in the fundamental space and the third harmonic space as follows:

$T_{e1(Trapezoid)} =$
$\frac{5P}{2}\{\psi_1 i_{q1} + 3\psi_3[0.5i_{d1}(\sin2\theta+\sin4\theta) - 0.5i_{q1}(\cos2\theta-\cos4\theta) + i_{z1}\cos3\theta]\}$ $T_{e3(Trapezoid)} =$
$\frac{5P}{2}\{3\psi_3 i_{q3} + \psi_1[0.5i_{d3}(\sin4\theta-\sin2\theta) + 0.5i_{q3}(\cos4\theta-\cos2\theta) + i_{z3}\cos\theta]\}$ where, $T_{e1(Trapezoid)}$ is a torque of the motor with the trapezoidal back-EMF in the fundamental space; $T_{e3(Trapezoid)}$ is a torque of the motor with the trapezoidal back-EMF in the third harmonic space; P is a number of pole pairs of the motor; $\Psi_1$ is an amplitude of a fundamental flux linkage; $\Psi_3$ is an amplitude of a third harmonic flux linkage; θ is a position angle of a rotor; $i_{d1}$ and $i_{q1}$ are $d_1$-$q_1$-axis currents in a fundamental rotating coordinate system; $i_{d3}$ and $i_{q3}$ are $d_3$-$q_3$-axis currents in a third harmonic rotating coordinate system; $i_{z1}$ is a generalized zero sequence component in the fundamental space; and $i_{z3}$ is a generalized zero sequence component in the third harmonic space;

step 4.2: taking, for the motor with the sinusoidal back-EMF, a derivative of a magnetic co-energy to a mechanical angle in case of a constant current; and ignoring the reluctance torque, and obtaining the torque expressions of the motor in the fundamental space and the third harmonic space as follows:

$$T_{e1(sin)} = \frac{5P}{2}\psi_1 i_{q1}$$

$$T_{e3(sin)} = \frac{5P}{2}\psi_1[0.5i_{d3}(\sin 4\theta - \sin 2\theta) + 0.5i_{q3}(\cos 4\theta - \cos 2\theta) + i_{z3}\cos\theta]$$

where, $T_{e1(sin)}$ is a torque of the motor with the sinusoidal back-EMF in the fundamental space; and $T_{e3(sin)}$ is a torque of the motor with the sinusoidal back-EMF in the third harmonic space.

Further, in step 5, the constructing, for the five-phase permanent magnet motor with the sinusoidal back-EMF or the trapezoidal back-EMF, an expression of an extra torque ripple produced by an interaction of a short-circuit current and a short-circuit back-EMF includes:

step 5.1: for the motor with the trapezoidal back-EMF, ignoring the reluctance torque, and expressing a permanent magnet torque generated between the short-circuit current and the short-circuit back-EMF as follows:

$$T_{sc(Trapezoid)} = \frac{e_{a(Trapezoid)} i_{sc} P}{\omega} = -i_{sc}P[\psi_1\sin\theta + 3\psi_3\sin 3\theta]$$

where, $T_{sc(Trapezoid)}$ is the extra torque ripple caused by the short-circuit current; $i_{sc}$ is the short-circuit current; ω is an electrical angular velocity of the motor, θ=ωt; and $e_{a(Trapezoid)}$ is a phase-A back-EMF of the motor with the trapezoidal back-EMF, which is expressed as follows:

$$e_{a(Trapezoid)} = \frac{d[\psi_1\cos(\omega t) + \psi_3\cos(3\omega t)]}{dt} = -\omega\psi_1\sin(\omega t) - 3\omega\psi_3\sin(3\omega t)$$

step 5.2: for the motor with the sinusoidal back-EMF, ignoring the reluctance torque, and expressing a permanent magnet torque generated between the short-circuit current and the short-circuit back-EMF as follows:

$$T_{sc(sin)} = \frac{e_{a(sin)} i_{sc} P}{\omega} = -i_{sc}P\psi_1\sin\theta$$

where, $T_{sc(sin)}$ is the extra torque ripple caused by the short-circuit current; and $e_{a(sin)}$ is a phase-A back-EMF of the motor with the sinusoidal back-EMF, which is expressed as follows:

$$e_{a(sin)} = \frac{d[\psi_1\cos(\omega t)]}{dt} = -\omega\psi_1\sin(\omega t).$$

Further, in step 6, for the five-phase permanent magnet motor with the sinusoidal back-EMF or the trapezoidal back-EMF, the short-circuit suppression currents to offset the extra torque ripple produced by the short-circuit current are generated by step 6.1: reasonably distributing, for the motor with the trapezoidal back-EMF, currents in synchronous rotating coordinate systems in the fundamental space and the third harmonic space to offset the extra torque ripple caused by the short-circuit current, where the short-circuit suppression currents are expressed as follows:

$$\begin{cases} i_{d1s(Trapezoid)} = 0.5939 i_{sc}\cos(\theta) \\ i_{q1s(Trapezoid)} = 0.3878 i_{sc}\sin(\theta) \\ i_{d3s(Trapezoid)} = -\frac{3\psi_3}{\psi_1}0.3878 i_{sc}\cos(\theta) \\ i_{q3s(Trapezoid)} = -\frac{3\psi_3}{\psi_1}0.5939 i_{sc}\sin(\theta) \\ i_{z1s(Trapezoid)} = 0 \\ i_{z3s(Trapezoid)} = 0 \end{cases}$$

where, $i_{d1s(Trapezoid)}$, $i_{q1s(Trapezoid)}$ and $i_{z1s(Trapezoid)}$ are short-circuit suppression currents on the $d_1$-$q_1$-$z_1$ axes in the synchronous rotating coordinate system in the fundamental space; and $i_{d3s(Trapezoid)}$, $i_{q3s(Trapezoid)}$ and $i_{z3s(Trapezoid)}$ are short-circuit suppression currents on the $d_3$-$q_3$-$z_3$ axes in the synchronous rotating coordinate system in the third harmonic space;

step 6.2: reasonably distributing, for the motor with the sinusoidal back-EMF, currents in a synchronous rotating coordinate system in the third harmonic space to offset the extra torque ripple caused by the short circuit, where the short-circuit suppression currents are expressed as follows:

$$\begin{cases} i_{d3s(sin)} = 0.4 i_{sc}\cos 3\theta \\ i_{q3s(sin)} = -0.4 i_{sc}\sin 3\theta \\ i_{z3s(sin)} = 0 \end{cases}$$

where, $i_{d3s(sin)}$, $i_{q3s(sin)}$ and $i_{z3s(sin)}$ are short-circuit suppression currents on the $d_3$-$q_3$-$z_3$ axes in the synchronous rotating coordinate system in the third harmonic space.

Further, in step 7, the obtaining, for the five-phase permanent magnet motor with the sinusoidal back-EMF or the trapezoidal back-EMF, open-circuit fault-tolerant reference currents to maintain a smooth output torque, through the q-axis current $i_q$ specifically includes:

step 7.1: reasonably distributing, for the motor with the trapezoidal back-EMF, currents in synchronous rotating coordinate systems in the fundamental space and the third harmonic space to generate a torque the same as that before the fault occurs and to suppress the extra torque ripple, where the open-circuit fault-tolerant reference currents are expressed as follows:

$$\begin{cases} i_{d1o(Trapezoid)} = 0, i_{d3o(Trapezoid)} = 0 \\ i_{q1o(Trapezoid)} = i_q, i_{q3o(Trapezoid)} = -\frac{3\psi_3}{\psi_1} i_{q1o(Trapezoid)} \\ i_{z1o(Trapezoid)} = 0.236 i_{q1o(Trapezoid)}\cos\theta \\ i_{z3o(Trapezoid)} = -3\frac{3\psi_3}{\psi_i} i_{z1o(Trapezoid)}\frac{\cos 3\theta}{\cos\theta} \end{cases}$$

where, $i_{d1o(Trapezoid)}$, $i_{q1o(Trapezoid)}$ and $i_{z1o(Trapezoid)}$ are open-circuit fault-tolerant reference currents on the $d_1$-$q_1$-$z_1$ axes in the synchronous rotating coordinate system in the fundamental space; and $i_{d3o(Trapezoid)}$, $i_{q3o(Trapezoid)}$ and $i_{z3o(Trapezoid)}$ are open-circuit fault-tolerant reference currents on the $d_3$-$q_3$-$z_3$ axes in the synchronous rotating coordinate system in the third harmonic space; and step 7.2: reasonably distributing, for the motor with the sinusoidal back-EMF, currents in a synchronous rotating coordinate system in the fundamental space to generate a torque the same as that before the fault occurs, where the open-circuit fault-tolerant reference currents are expressed as follows:

$$\begin{cases} i_{d1o(sin)} = 0 \\ i_{q1o(sin)} = i_q \\ i_{z1o(sin)} = 0.236 i_{q1o(sin)} \cos\theta \end{cases}$$

where, $i_{d1o(sin)}$, $i_{q1o(sin)}$ and $i_{z1o(sin)}$ are open-circuit fault-tolerant reference currents on the $d_1$-$q_1$-$z_1$ axes in the synchronous rotating coordinate system in the fundamental space.

Further, in step 8, for the five-phase permanent magnet motor with the sinusoidal back-EMF or the trapezoidal back-EMF, the open-circuit fault-tolerant reference currents and the short-circuit suppression currents on the $d_1$-$q_1$-$z_1$ axes the $d_3$-$q_3$-$z_3$ axes are transformed into a natural coordinate system through coordinate transformation, and superposed; then the currents integrated in the natural coordinate system are transformed to the $d_1$-$q_1$-$z_1$ axes, thereby forming optimal short-circuit fault-tolerant reference currents $i_{dr}$, $i_{qr}$ and $i_{zr}$.

Further, in step 9, the optimal fault-tolerant reference voltages $u_{dr}$, $u_{qr}$ and $u_{zr}$ under the short-circuit fault are obtained through the deadbeat model predictive current control; and the discrete model required by the deadbeat model predictive control under the fault state is constructed by step 9.1: obtaining a stator voltage equation for the motor with the trapezoidal back-EMF in case of a single-phase open-circuit fault:

$$\begin{cases} u_d = R_s i_d - \omega L_q i_q + L_d \dfrac{di_d}{dt} \\ u_q = R_s i_q + \omega L_d i_d + L_q \dfrac{di_q}{dt} + \omega\psi_1 \\ u_z = R_s i_z + L_s \dfrac{di_z}{dt} + 3\omega\psi_3 \cos(3\theta) \end{cases}$$

where, $L_d$, $L_q$, $L_s$ are inductance components of the axes in a rotating coordinate system in the fundamental space; $R_s$ is a stator resistance; $\theta$ is a position angle of a rotor; $\omega$ is an electrical angular velocity of the motor; $u_d$, $u_q$ and $u_z$ are voltage components on the $d_1$-$q_1$-$z_1$ axes in the synchronous rotating coordinate system in the fundamental space; $i_d$, $i_q$ and $i_z$ are current components on the $d_1$-$q_1$-$z_1$ axes in the synchronous rotating coordinate system in the fundamental space; $\Psi_1$ is an amplitude of the fundamental flux linkage; and $\Psi_3$ is an amplitude of the third harmonic flux linkage;

step 9.2: transforming, for the motor with the trapezoidal back-EMF, the continuous stator voltage equation into a discrete equation through forward Euler discretization:

$$\begin{cases} i_d(k+1) = \left(1 - \dfrac{R_s T_s}{L_d}\right) i_d(k) + \omega \dfrac{L_q T_s}{L_d} i_q(k) + \dfrac{T_s}{L_d} u_d(k) \\ i_q(k+1) = -\omega \dfrac{L_d T_s}{L_q} i_d(k) + \left(1 - \dfrac{R_s T_s}{L_q}\right) i_q(k) + \dfrac{T}{L_q} u_q(k) - \dfrac{\omega\psi_1 T_s}{L_q} \\ i_z(k+1) = \left(1 - \dfrac{R_s T_s}{L_s}\right) i_z(k) + \dfrac{T_s}{L_s} u_z(k) - \dfrac{3\omega\psi_3 \cos(3\theta) T_s}{L_s} \end{cases}$$

where, $T_s$ is a sampling time; $i_d(k)$, $i_q(k)$ and $i_z(k)$ are current components on the $d_1$-$q_1$-$z_1$ axes in the synchronous rotating coordinate system in the fundamental space at a current time; $i_d(k+1)$, $i_q(k+1)$ and $i_z(k+1)$ are current components on the $d_1$-$q_1$-$z_1$ axes in the synchronous rotating coordinate system in the fundamental space at a next time; $u_d(k)$, $u_q(k)$ and $u_z(k)$ are voltage components on the $d_1$-$q_1$-$z_1$ axes in the synchronous rotating coordinate system in the fundamental space at the current time;

step 9.3: setting, for the motor with the trapezoidal back-EMF, currents at the next time be equal to optimal short-circuit fault-tolerant reference currents, and combining currents obtained in a current sampling period, to obtain optimal short-circuit fault-tolerant voltages required at the current time, which are written in form of a matrix as follows:

$$\begin{bmatrix} u_{dr} \\ u_{qr} \\ u_{zr} \end{bmatrix} = \begin{bmatrix} R_s - \dfrac{L_d}{T} & -\omega L_q & 0 \\ \omega L_d & R_s - \dfrac{L_q}{T} & 0 \\ 0 & 0 & R_s - \dfrac{L_s}{T_s} \end{bmatrix} \begin{bmatrix} i_d(k) \\ i_q(k) \\ i_z(k) \end{bmatrix} +$$

$$\begin{bmatrix} \dfrac{L_d}{T_s} & 0 & 0 \\ 0 & \dfrac{L_q}{T_s} & 0 \\ 0 & 0 & \dfrac{L_s}{T_s} \end{bmatrix} \begin{bmatrix} i_{dr} \\ i_{qr} \\ i_{zr} \end{bmatrix} + \begin{bmatrix} 0 \\ \omega\psi_1 \\ 3\omega\psi_3 \cos 3\theta \end{bmatrix}$$

step 9.4: setting $\Psi_3$ in the matrix expression of the optimal short-circuit fault-tolerant voltages to be zero to obtain a matrix expression of optimal short-circuit fault-tolerant voltages for the motor with the sinusoidal back-EMF as follows:

$$\begin{bmatrix} u_{dr} \\ u_{qr} \\ u_{zr} \end{bmatrix} = \begin{bmatrix} R_s - \dfrac{L_d}{T_s} & -\omega L_q & 0 \\ \omega L_d & R_s - \dfrac{L_q}{T_s} & 0 \\ 0 & 0 & R_s - \dfrac{L_s}{T_s} \end{bmatrix} \begin{bmatrix} i_d(k) \\ i_q(k) \\ i_z(k) \end{bmatrix} +$$

$$\begin{bmatrix} \dfrac{L_d}{T_s} & 0 & 0 \\ 0 & \dfrac{L_q}{T_s} & 0 \\ 0 & 0 & \dfrac{L_s}{T_s} \end{bmatrix} \begin{bmatrix} i_{dr} \\ i_{qr} \\ i_{zr} \end{bmatrix} + \begin{bmatrix} 0 \\ \omega\psi_1 \\ 0 \end{bmatrix}.$$

Further, in step 10, the obtained optimal fault-tolerant reference voltages $u_{dr}$, $u_{qr}$ and $u_{zr}$ are input into a CPWM module through coordinate transformation to obtain switching signals of phases; and the obtained switching signals are input into the inverter to control the motor, thereby realizing the short-circuit fault-tolerant control of the five-phase permanent magnet motor.

The present invention has the following beneficial effects:

1. By fully utilizing the third harmonic space of the five-phase permanent magnet motor in a fault state, the present invention proposes a fault-tolerant control strategy for a five-phase permanent magnet motor with a sinusoidal back-EMF or a trapezoidal back-EMF in case of a single-phase short-circuit fault. The present invention enables the five-phase permanent magnet motor to make full use of the third harmonic space during fault-tolerant operation, thereby improving the torque output of the motor in a fault state and improving the fault-tolerant operation efficiency of the motor. In addition, the present invention expands the speed range of the motor during fault-tolerant operation, making it better suitable for electric vehicles and other applications that require high reliability and wide speed range.

2. Compared with a traditional PI controller, the deadbeat model predictive current control algorithm in the fault state adopted by the present invention can better track the alternating fault-tolerant reference currents under the fault state and enable the motor to have better fault-tolerant performance and dynamic response.

3. The PWM modulation adopted in the present invention is CPWM. Compared with current hysteresis modulation adopted in a traditional fault-tolerant algorithm, CPWM has a fixed modulation period, which reduces the switching loss of the inverter.

BRIEF DESCRIPTION OF THE DRAWINGS

FIGS. 2A and 2B: Generation of optimal fault-tolerant reference currents; wherein FIG. 2A shows a motor with trapezoidal back-electromotive force (EMF); and FIG. 2B shows a motor with sinusoidal back-EMF;

DETAILED DESCRIPTION OF THE EMBODIMENTS

Figure 1:
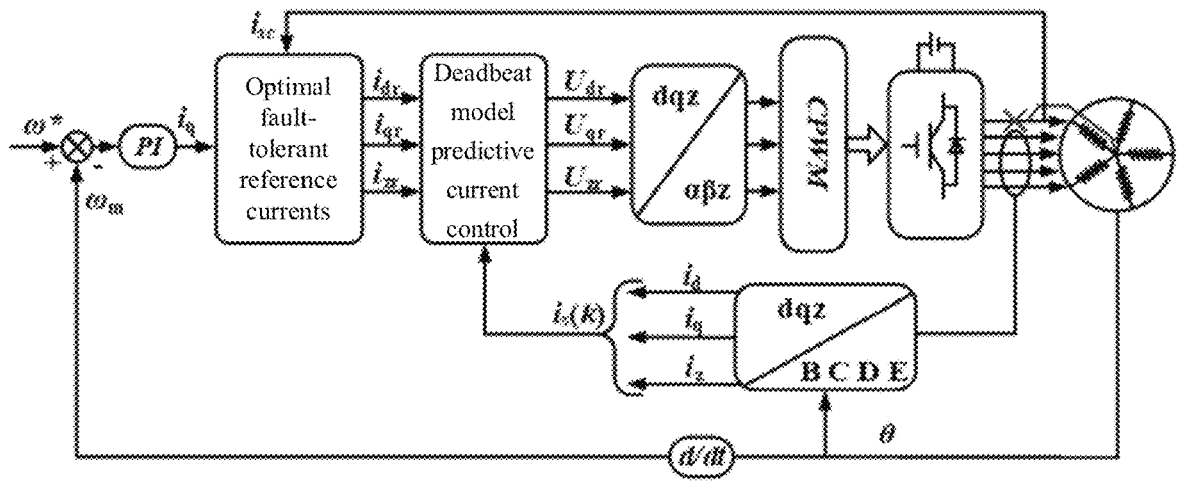
FIG. 1: Fault-tolerant control of a five-phase permanent magnet motor under single-phase short-circuit fault.

The present invention provides a short-circuit fault-tolerant control method based on deadbeat current tracking for a five-phase permanent magnet motor with a sinusoidal back-electromotive force or a trapezoidal back-electromotive force (EMF). The method includes the following steps: detect a motor speed, compare a given speed ω* with an actual feedback speed $\omega_m$, and obtain a given current $i_q$ of a q-axis of the motor by a proportional integral (PI) controller; obtain, by using the given current $i_q$ of the q-axis, reference currents $i_{d1o}$, $i_{q1o}$, $i_{z1o}$, $i_{d3o}$, $i_{q3o}$ and $i_{z3o}$ to maintain an output torque, through torque expressions in a fundamental space and a third harmonic space; obtain short-circuit suppression currents $i_{d1s}$, $i_{q1s}$, $i_{z1s}$, $i_{d3s}$, $i_{q3s}$ and $i_{z3s}$ related to a short-circuit current $i_{sc}$, so as to suppress torque ripples caused by the short-circuit current; superpose the reference currents and the short-circuit suppression currents to maintain the output torque in the respective space, and integrate the currents into the fundamental space through transformation matrixes to form optimal fault-tolerant reference currents $i_{dr}$, $i_{qr}$ and $i_{zr}$; transform currently sampled currents of remaining normal phases to $d_1$-$q_1$-$z_1$ axes through coordinate transformation, combine with the optimal reference currents, and obtain optimal fault-tolerant reference voltages $u_{dr}$, $u_{qr}$ and $u_{zr}$ through deadbeat model predictive control; and input the optimal fault-tolerant reference voltages into a carrier-based pulse width modulation (CPWM) module to obtain switching signals of each phase, and control the motor through an inverter to realize the short-circuit fault-tolerant control of the five-phase permanent magnet motor with the sinusoidal back-EMF or the trapezoidal back-EMF.

The technical solutions in the embodiments of the present invention are described clearly and completely below with reference to the drawings. The embodiments of the present invention are described below in detail. Examples of the embodiments are shown in the drawings. The same or similar numerals represent the same or similar elements or elements having the same or similar functions throughout the specification. The embodiments described below with reference to the drawings are exemplary. They are only used to explain the present invention, and should not be construed as a limitation to the present invention.

As shown in FIG. 1, the short-circuit fault-tolerant control method based on deadbeat current tracking for a five-phase permanent magnet motor with a sinusoidal back-EMF or a trapezoidal back-EMF includes the following steps:

Step 1: A speed of a five-phase permanent magnet motor is detected as a feedback speed $\omega_m$ of the motor. A given speed ω* is compared with the feedback speed $\omega_m$ to obtain a speed error $e_r$ of the motor. A q-axis current of the motor is calculated by a proportional integral (PI) controller according to the speed error $e_r$. The PI controller outputs a given q-axis current $i_q$.

Step 2: When a short-circuit fault occurs, an influence of a fault phase on the motor is divided into two aspects: an influence of a loss of the fault phase on a torque output and an influence of a fault phase short-circuit current on the torque output. When the influence of the fault phase short-circuit current on the torque output is offset, a short-circuit fault model is equivalent to an open-circuit fault model.

Step 3: Reduced-order matrixes in a fundamental space and a third harmonic space are constructed as follows. In case a single-phase open-circuit fault occurs, an element corresponding to a fault phase is removed, and the matrixes are reconstructed based on a principle that a circular trajectory of a flux linkage and the back-EMF of the motor remains unchanged in an α-β plane after the fault.

After an element corresponding to a phase A is removed, a matrix is obtained as follows:

$$T^A_{clarke} = \frac{2}{5}\begin{bmatrix} \cos\alpha & \cos 2\alpha & \cos 3\alpha & \cos 4\alpha \\ \sin\alpha & \sin 2\alpha & \sin 3\alpha & \sin 4\alpha \\ \cos 3\alpha & \cos 6\alpha & \cos 9\alpha & \cos 12\alpha \\ \sin 3\alpha & \sin 6\alpha & \sin 9\alpha & \sin 12\alpha \\ 1/2 & 1/2 & 1/2 & 1/2 \end{bmatrix}$$

where, $T_{clarke}^A$ is a clarke transformation matrix under a phase-A fault, and α=0.4π.

In case of a fault, a first row and a third row of elements of the clarke transformation matrix are not orthogonal. In order to obtain a reduced-order transformation matrix in the fundamental space, the third row of elements of the matrix are removed. Based on a principle that a circular trajectory of a flux linkage and the back-EMF of the motor in an α-β plane remains unchanged after the fault, the matrix is reconstructed to obtain a reduced-order clarke transformation matrix and a reduced-order park transformation matrix in the fundamental space under a phase-A open-circuit fault:

$$T^A_{clarke1} = \frac{2}{5}\begin{bmatrix} \cos a - 1 & \cos 2a - 1 & \cos 3a - 1 & \cos 4a - 1 \\ \sin\alpha & \sin 2\alpha & \sin 3\alpha & \sin 4\alpha \\ \sin 3\alpha & \sin 6\alpha & \sin 9\alpha & \sin 12\alpha \\ 1/2 & 1/2 & 1/2 & 1/2 \end{bmatrix}$$

$$T_{park1}^A = \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix}$$

where, $T_{clarke1}^A$ is the reduced-order clarke transformation matrix in the fundamental space; $T_{park1}^A$ is the reduced-order park transformation matrix in the fundamental space; and $\theta$ is a position angle of a rotor.

In case of a fault, a first row and a third row of elements of the clarke transformation matrix are not orthogonal. In order to obtain a reduced-order transformation matrix in the third harmonic space, the first row of elements of the matrix are removed. Based on the principle that the circular trajectory of the flux linkage and the back-EMF of the motor in an $\alpha_3$-$\beta_3$ plane remains unchanged after the fault, the matrix is reconstructed to obtain a reduced-order clarke transformation matrix and a reduced-order park transformation matrix in the third harmonic space under the phase-A open-circuit fault:

$$T_{clarke3}^A = \frac{2}{5}\begin{bmatrix} \cos3\alpha-1 & \cos6\alpha-1 & \cos9\alpha-1 & \cos12\alpha-1 \\ \sin3\alpha & \sin6\alpha & \sin9\alpha & \sin12\alpha \\ \sin\alpha & \sin2\alpha & \sin3\alpha & \sin4\alpha \\ 1/2 & 1/2 & 1/2 & 1/2 \end{bmatrix}$$

$$T_{park3}^A = \begin{bmatrix} \cos3\theta & \sin3\theta & 0 & 0 \\ -\sin3\theta & \cos3\theta & 0 & 0 \\ 0 & 0 & 1 & 0 \\ 0 & 0 & 0 & 1 \end{bmatrix}$$

where, $T_{clarke3}^A$ is the reduced-order clarke transformation matrix in the third harmonic space; and $T_{park3}^A$ is the reduced-order park transformation matrix in the third harmonic space.

Step 4: For a five-phase permanent magnet motor with a sinusoidal back-EMF or a trapezoidal back-EMF, torque expressions of the motor under the fault in the fundamental space and the third harmonic space are obtained as follows.

Step 4.1: For the motor with the trapezoidal back-EMF, a derivative of a magnetic co-energy to a mechanical angle is taken in case of a constant current. A reluctance torque is ignored, and the torque expressions of the motor in the fundamental space and the third harmonic space are obtained as follows:

$T_{e1(Trapezoid)} =$ $\frac{5P}{2}\{\psi_1 i_{q1} + 3\psi_3[0.5i_{d1}(\sin2\theta+\sin4\theta) - 0.5i_{q1}(\cos2\theta-\cos4\theta) + i_{z1}\cos3\theta]\}$ $T_{e3(Trapezoid)} =$ $\frac{5P}{2}\{3\psi_3 i_{q3} + \psi_1[0.5i_{d3}(\sin4\theta-\sin2\theta) + 0.5i_{q3}(\cos4\theta-\cos2\theta) + i_{z3}\cos\theta]\}$ where, $T_{e1(Trapezoid)}$ is a torque of the motor with the trapezoidal back-EMF in the fundamental space; $T_{e3(Trapezoid)}$ is a torque of the motor with the trapezoidal back-EMF in the third harmonic space; P is a number of pole pairs of the motor; $\Psi_1$ is an amplitude of a fundamental flux linkage; $\Psi_3$ is an amplitude of a third harmonic flux linkage; $\theta$ is a position angle of a rotor; $i_{d1}$ and $i_{q1}$ are $d_1$-$q_1$-axis currents in a fundamental rotating coordinate system; $i_{d3}$ and $i_{q3}$ are $d_3$-$q_3$-axis currents in a third harmonic rotating coordinate system; $i_{z1}$ is a generalized zero sequence component in the fundamental space; and $i_{z3}$ is a generalized zero sequence component in the third harmonic space.

Step 4.2: For the motor with the sinusoidal back-EMF, a derivative of a magnetic co-energy to a mechanical angle is taken in case of a constant current. The reluctance torque is ignored, and the torque expressions of the motor in the fundamental space and the third harmonic space are obtained as follows:

$$T_{e1(sin)} = \frac{5P}{2}\psi_1 i_{q1}$$

$$T_{e3(sin)} = \frac{5P}{2}\psi_1[0.5i_{d3}(\sin4\theta-\sin2\theta) + 0.5i_{q3}(\cos4\theta-\cos2\theta) + i_{z3}\cos\theta]$$

where, $T_{e1(sin)}$ is a torque of the motor with the sinusoidal back-EMF in the fundamental space; and $T_{e3(sin)}$ is a torque of the motor with the sinusoidal back-EMF in the third harmonic space.

Step 5: For the five-phase permanent magnet motor with the sinusoidal back-EMF or the trapezoidal back-EMF, an expression of an extra torque ripple produced by an interaction of a short-circuit current and a short-circuit back-EMF is constructed as follows.

Step 5.1: For the motor with the trapezoidal back-EMF, the reluctance torque is ignored, and a permanent magnet torque generated between the short-circuit current and the short-circuit back-EMF is expressed as follows:

$$T_{sc(Trapezoid)} = \frac{e_{a(Trapezoid)} i_{sc} P}{\omega} = -i_{sc} P[\psi_1 \sin\theta + 3\psi_3 \sin3\theta]$$

where, $T_{sc(Trapezoid)}$ is the extra torque ripple caused by the short-circuit current; $i_{sc}$ is the short-circuit current; $\omega$ is an electrical angular velocity of the motor, $\theta=\omega t$; and $e_{a(Trapezoid)}$ is a phase-A back-EMF of the motor with the trapezoidal back-EMF, which is expressed as follows:

$$e_{a(Trapezoid)} = \frac{d[\psi_1 \cos(\omega t) + \psi_3 \cos(3\omega t)]}{dt} = -\omega\psi_1\sin(\omega t) - 3\omega\psi_3\sin(3\omega t)$$

Step 5.2: For the motor with the sinusoidal back-EMF, the reluctance torque is ignored, and a permanent magnet torque generated between the short-circuit current and the short-circuit back-EMF is expressed as follows:

$$T_{sc(sin)} = \frac{e_{a(sin)} i_{sc} P}{\omega} = -i_{sc} P \psi_1 \sin\theta$$

where, $T_{sc(sin)}$ is the extra torque ripple caused by the short-circuit current; and $e_{a(sin)}$ is a phase-A back-EMF of the motor with the sinusoidal back-EMF, which is expressed as follows:

$$e_{a(sin)} = \frac{d[\psi_1 \cos(\omega t)]}{dt} = -\omega\psi_1\sin(\omega t).$$

Step 6: For the five-phase permanent magnet motor with the sinusoidal back-EMF or the trapezoidal back-EMF, the short-circuit suppression currents to offset the extra torque ripple produced by the short-circuit current are generated as follows.

Step 6.1: For the motor with the trapezoidal back-EMF, currents in synchronous rotating coordinate systems in the fundamental space and the third harmonic space are reasonably distributed to offset an extra torque ripple caused by the short-circuit current, where the short-circuit suppression currents are expressed as follows:

$$\begin{cases} i_{d1s(Trapezoid)} = 0.5939 i_{sc}\cos(\theta) \\ i_{q1s(Trapezoid)} = 0.3878 i_{sc}\sin(\theta) \\ i_{d3s(Trapezoid)} = -\dfrac{3\psi_3}{\psi_1} 0.3878 i_{sc}\cos(\theta) \\ i_{q3s(Trapezoid)} = -\dfrac{3\psi_3}{\psi_1} 0.5939 i_{sc}\sin(\theta) \\ i_{z1s(Trapezoid)} = 0 \\ i_{z3s(Trapezoid)} = 0 \end{cases}$$

where, $i_{d1s(Trapezoid)}$, $i_{q1s(Trapezoid)}$ and $i_{z1s(Trapezoid)}$ are short-circuit suppression currents on the $d_1$-$q_1$-$z_1$ axes in the synchronous rotating coordinate system in the fundamental space; and $i_{d3s(Trapezoid)}$, $i_{q3s(Trapezoid)}$ and $i_{z3s(Trapezoid)}$ are short-circuit suppression currents on the $d_3$-$q_3$-$z_3$ axes in the synchronous rotating coordinate system in the third harmonic space.

Step 6.2: For the motor with the sinusoidal back-EMF, currents in a synchronous rotating coordinate system in the third harmonic space are reasonably distributed to offset the extra torque ripple caused by the short circuit, where the short-circuit suppression currents are expressed as follows:

$$\begin{cases} i_{d3s(sin)} = 0.4 i_{sc}\cos 3\theta \\ i_{q3s(sin)} = -0.4 i_{sc}\sin 3\theta \\ i_{z3s(sin)} = 0 \end{cases}$$

where, $i_{d3s(sin)}$, $i_{q3s(sin)}$ and $i_{z3s(sin)}$ are short-circuit suppression currents on the $d_3$-$q_3$-$z_3$ axes in the synchronous rotating coordinate system in the third harmonic space.

Step 7: For the five-phase permanent magnet motor with the sinusoidal back-EMF or the trapezoidal back-EMF, open-circuit fault-tolerant reference currents to maintain a smooth output torque are obtained through the q-axis current $i_q$.

Step 7.1: For the motor with the trapezoidal back-EMF, currents in synchronous rotating coordinate systems in the fundamental space and the third harmonic space are reasonably distributed to generate a torque the same as that before the fault occurs and to suppress the extra torque ripple, where the open-circuit fault-tolerant reference currents are expressed as follows:

$$\begin{cases} i_{d1o(Trapezoid)} = 0, i_{d3o(Trapezoid)} = 0 \\ i_{q1o(Trapezoid)} = i_q, i_{q3o(Trapezoid)} = -\dfrac{3\psi_3}{\psi_1} i_{q1o(Trapezoid)} \\ i_{z1o(Trapezoid)} = 0.236 i_{q1o(Trapezoid)}\cos\theta \\ i_{z3o(Trapezoid)} = -3\dfrac{\psi_3}{\psi_1} i_{z1o(Trapezoid)} \dfrac{\cos 3\theta}{\cos\theta} \end{cases}$$

where, $i_{d1o(Trapezoid)}$, $i_{q1o(Trapezoid)}$ and $i_{z1o(Trapezoid)}$ are open-circuit fault-tolerant reference currents on the $d_1$-$q_1$-$z_1$ axes in the synchronous rotating coordinate system in the fundamental space; and $i_{d3o(Trapezoid)}$, $i_{q3o(Trapezoid)}$ and $i_{z3o(Trapezoid)}$ are open-circuit fault-tolerant reference currents on the $d_3$-$q_3$-$z_3$ axes in the synchronous rotating coordinate system in the third harmonic space.

Step 7.2: For the motor with the sinusoidal back-EMF, currents in a synchronous rotating coordinate system in the fundamental space are reasonably distributed to generate a torque the same as that before the fault occurs, where the open-circuit fault-tolerant reference currents are expressed as follows:

$$\begin{cases} i_{d1o(sin)} = 0 \\ i_{q1o(sin)} = i_q \\ i_{z1o(sin)} = 0.236 i_{q1o(sin)}\cos\theta \end{cases}$$

where, $i_{d1o(sin)}$, $i_{q1o(sin)}$ and $i_{z1o(sin)}$ are open-circuit fault-tolerant reference currents on the $d_1$-$q_1$-$z_1$ axes in the synchronous rotating coordinate system in the fundamental space.

Figure 2A:
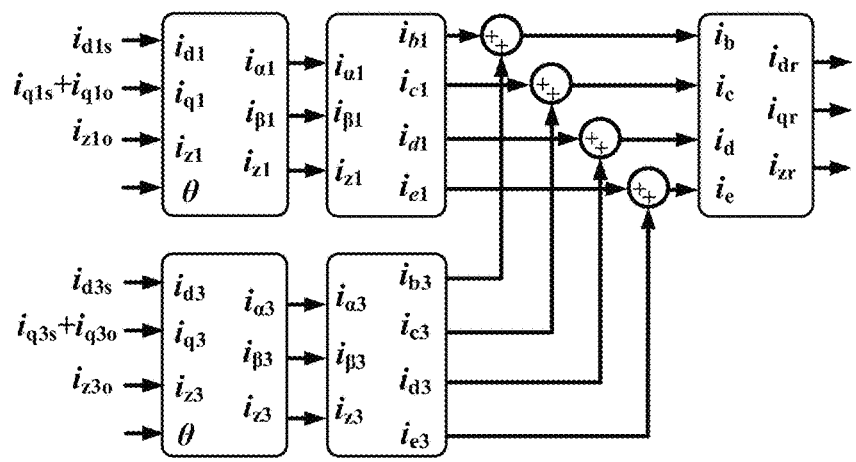
Figure 2B:
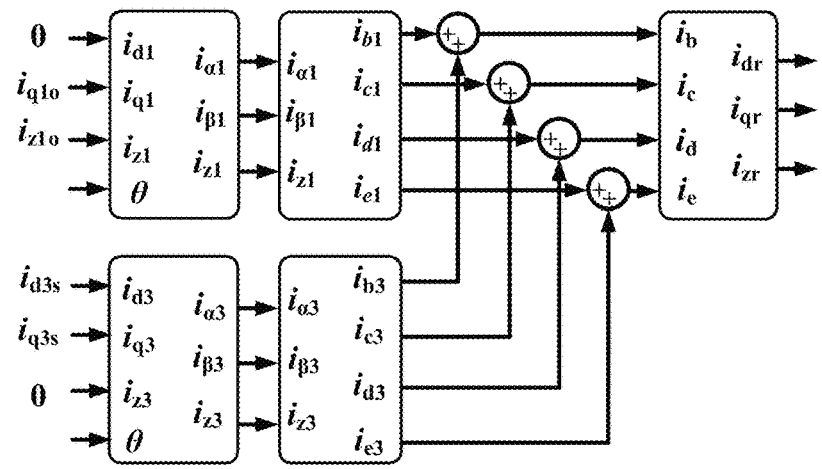

Step 8: The reference currents to maintain the stable output torque and the short-circuit suppression currents on $d_1$-$q_1$-$z_1$ axes and a $d_3$-$q_3$-$z_3$ axes are transformed into a natural coordinate system through coordinate transformation, and are superposed according to a superposition theorem. The currents integrated in the natural coordinate system are transformed to the $d_1$-$q_1$-$z_1$ axes through an inverse matrix of the reduced-order transformation matrix in the fundamental space, thereby forming optimal short-circuit fault-tolerant reference currents $i_{dr}$, $i_{qr}$ and $i_{zr}$; The superposition process is shown in FIGS. 2A-2B. FIG. 2A indicates generation of optimal fault-tolerant reference currents of the motor with the trapezoidal back-EMF; and FIG. 2B indicates generation of optimal fault-tolerant reference currents of the motor with the sinusoidal back-EMF.

Step 9: The optimal fault-tolerant reference voltages $u_{dr}$, $u_{qr}$ and $u_{zr}$ under the short-circuit fault are obtained through the deadbeat model predictive current control. The deadbeat model predictive control model under the fault state is constructed as follows:

Step 9.1: For the five-phase permanent magnet motor with the trapezoidal back-EMF, a deadbeat model predictive control model in case of a single-phase open-circuit fault is obtained as follows:

$$\begin{bmatrix} u_{dr} \\ u_{qr} \\ u_{zr} \end{bmatrix} = \begin{bmatrix} R_s - \dfrac{L_d}{T_s} & -\omega L_q & 0 \\ \omega L_d & R_s - \dfrac{L_q}{T_s} & 0 \\ 0 & 0 & R_s - \dfrac{L_s}{T_s} \end{bmatrix} \begin{bmatrix} i_d(k) \\ i_q(k) \\ i_z(k) \end{bmatrix} +$$

$$\begin{bmatrix} \dfrac{L_d}{T_s} & 0 & 0 \\ 0 & \dfrac{L_q}{T_s} & 0 \\ 0 & 0 & \dfrac{L_s}{T_s} \end{bmatrix} \begin{bmatrix} i_{dr} \\ i_{qr} \\ i_{zr} \end{bmatrix} + \begin{bmatrix} 0 \\ \omega\psi_1 \\ 3\omega\psi_3\cos 3\theta \end{bmatrix}$$

Step 9.2: For the five-phase permanent magnet motor with the sinusoidal back-EMF, a deadbeat model predictive control model in case of a single-phase open-circuit fault is obtained as follows:

$$\begin{bmatrix} u_{dr} \\ u_{qr} \\ u_{zr} \end{bmatrix} = \begin{bmatrix} R_s - \dfrac{L_d}{T_s} & -\omega L_q & 0 \\ \omega L_d & R_s - \dfrac{L_q}{T_s} & 0 \\ 0 & 0 & R_s - \dfrac{L_s}{T_s} \end{bmatrix} \begin{bmatrix} i_d(k) \\ i_q(k) \\ i_z(k) \end{bmatrix} +$$

$$\begin{bmatrix} \dfrac{L_d}{T_s} & 0 & 0 \\ 0 & \dfrac{L_q}{T_s} & 0 \\ 0 & 0 & \dfrac{L_s}{T_s} \end{bmatrix} \begin{bmatrix} i_{dr} \\ i_{qr} \\ i_{zr} \end{bmatrix} + \begin{bmatrix} 0 \\ \omega\psi_1 \\ 0 \end{bmatrix}$$

Step 10: The obtained optimal fault-tolerant reference voltages $u_{dr}$, $u_{qr}$ and $u_{zr}$ are input into a carrier-based pulse width modulation (CPWM) module through coordinate transformation to obtain switching signals of phases. The obtained switching signals are input into an inverter to control the motor, thereby realizing the short-circuit fault-tolerant control of the five-phase permanent magnet motor.

Figure 3:
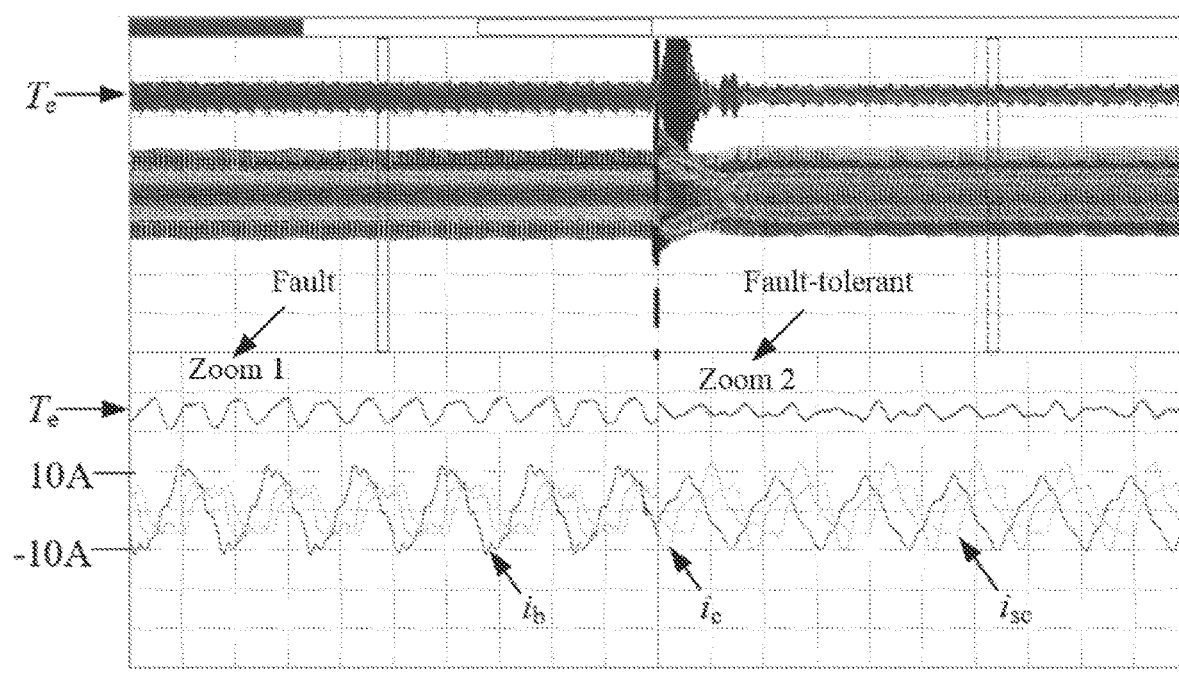
FIG. 3: Fault-tolerant operation of five-phase permanent magnet motor with trapezoidal back-EMF.
Figure 4A:
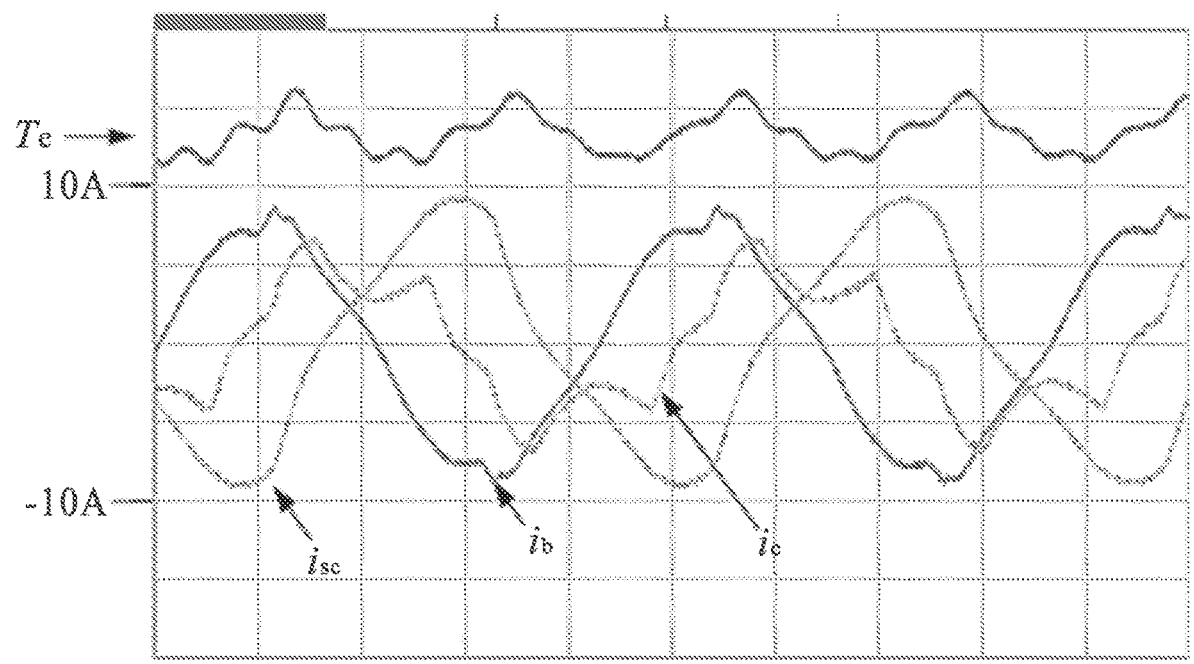
FIG. 4A shows a fault waveform of five-phase permanent magnet motor with sinusoidal back-EMF.
Figure 4B:
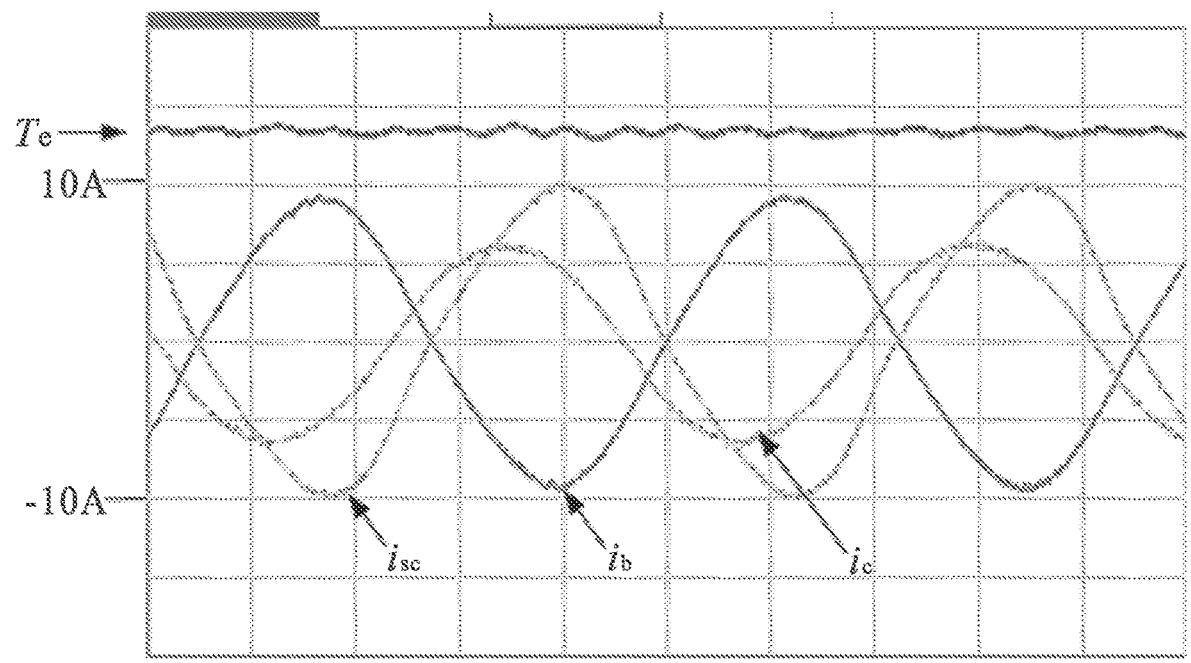
FIG. 4B shows a fault-tolerant waveform of five-phase permanent magnet motor with sinusoidal back-EMF.

As shown in FIGS. 3 and 4A-4B, when the fault-tolerant control strategy of the present invention is adopted, the torque ripples of both a permanent magnet motor with a sinusoidal back-EMF and a permanent magnet motor with a trapezoidal back-EMF are significantly reduced, proving the correctness of the fault-tolerant strategy.

Figure 5:
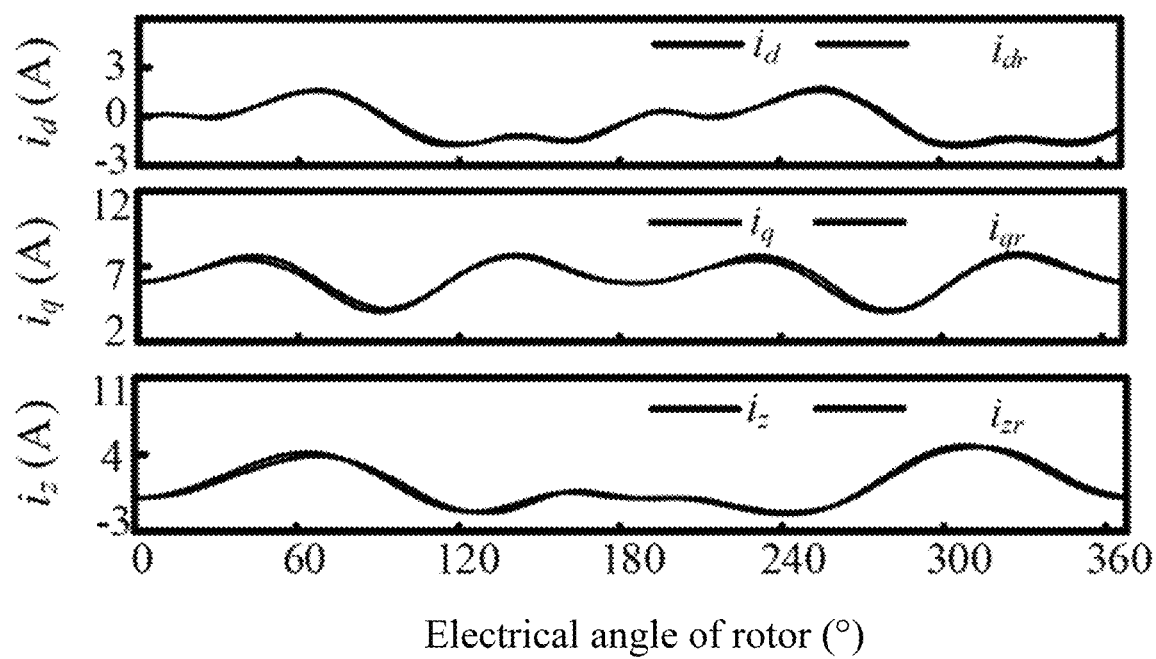
FIG. 5: d, q and z-axis tracking of five-phase permanent magnet motor under fault.

It can be seen from FIG. 5 that during the fault-tolerant operation, the actual feedback currents of the d, q and z axes are well tracked with the optimal fault-tolerant reference currents.

In the description of the present specification, the description with reference to the terms "one embodiment", "some embodiments", "an illustrative embodiment", "an example", "a specific example", or "some examples" means that specific features, structures, materials or characteristics described in connection with the embodiment or example are included in at least one embodiment or example of the present invention. In this specification, the schematic descriptions of the above terms do not necessarily refer to the same embodiment or example. Moreover, the specific features, structures, materials or characteristics described may be combined in any suitable manner in any one or more embodiments or examples.

Although the embodiments of the present invention have been illustrated, it should be understood that those of ordinary skill in the art may still make various changes, modifications, replacements and variations to the above embodiments without departing from the principle and spirit of the present invention, and the scope of the present invention is limited by the claims and legal equivalents thereof.

What is claimed is:

1. A short-circuit fault-tolerant control method based on a deadbeat current tracking for a five-phase permanent magnet motor with a sinusoidal back-electromotive force (EMF) or a trapezoidal back EMF, comprising the following steps:

step 1: detecting a speed of the five-phase permanent magnet motor with the sinusoidal back-EMF or the trapezoidal back-EMF as a feedback speed $\omega_m$ of the five-phase permanent magnet motor; comparing a given speed $\omega^*$ with the feedback speed $\omega_m$ to obtain a speed error $e_r$ of the five-phase permanent magnet motor; calculating, by a proportional integral (PI) controller, a q-axis current of the five-phase permanent magnet motor according to the speed error $e_r$; and outputting, by the PI controller, a given q-axis current $i_q$;

step 2: compensating a short-circuit current, and analyzing and processing a short-circuit fault as an open-circuit fault;

step 3: reconstructing reduced-order matrixes in a fundamental space and a third harmonic space under a single-phase short-circuit fault respectively;

step 4: ignoring a reluctance torque, and obtaining torque expressions of the five-phase permanent magnet motor under the short-circuit fault in the fundamental space and the third harmonic space through the reduced-order matrixes respectively;

step 5: constructing, for the five-phase permanent magnet motor with the sinusoidal back-EMF or the trapezoidal back-EMF, an expression of an extra torque ripple generated by an interaction of a short-circuit current and a short-circuit back-EMF;

step 6: generating, through the torque expressions in the fundamental space and the third harmonic space, short-circuit suppression currents $i_{d1s}$, $i_{q1s}$, $i_{z1s}$, $i_{d3s}$, $i_{q3s}$ and $i_{z3s}$ to offset the extra torque ripple caused by the short-circuit current, wherein $i_{d1s}$, $i_{q1s}$ and $i_{z1s}$ are short-circuit suppression currents in the fundamental space, and $i_{d3s}$, $i_{q3s}$ and $i_{z3s}$ are short-circuit suppression currents in the third harmonic space;

step 7: obtaining, for the five-phase permanent magnet motor with the sinusoidal back-EMF or the trapezoidal back-EMF, open-circuit fault-tolerant reference currents $i_{d1o}$, $i_{q1o}$, $i_{z1o}$, $i_{d3o}$, $i_{q3o}$ and $i_{z3o}$ to maintain a smooth output torque, through the given q-axis current $i_q$ and the torque expressions in the fundamental space and the third harmonic space under the short-circuit fault, wherein $i_{d1o}$, $i_{q1o}$ and $i_{z1o}$ are open-circuit fault-tolerant reference currents in the fundamental space, and $i_{d3o}$, $i_{q3o}$ and $i_{z3o}$ are open-circuit fault-tolerant reference currents in the third harmonic space;

step 8: transforming the open-circuit fault-tolerant reference currents to maintain the smooth output torque and the short-circuit suppression currents on $d_1$-$q_1$-$z_1$ axes in the fundamental space and $d_3$-$q_3$-$z_3$ axes in the third harmonic space into a natural coordinate system through a coordinate transformation, and superposing the open-circuit fault-tolerant reference currents and the short-circuit suppression currents according to a superposition theorem; and transforming the open-circuit fault-tolerant reference currents and the short-circuit suppression currents integrated in the natural coordinate system to the $d_1$-$q_1$-$z_1$ axes through an inverse matrix of a reduced-order transformation matrix in the fundamental space, thereby forming optimal short-circuit fault-tolerant reference currents $i_{dr}$, $i_{qr}$ and $i_{zr}$;

step 9: constructing a discrete model for the five-phase permanent magnet motor with the sinusoidal back-EMF or the trapezoidal back-EMF under the short-circuit fault, and obtaining optimal fault-tolerant reference voltages $u_{dr}$, $u_{qr}$ and $u_{zr}$ under the short-circuit fault through deadbeat model predictive current control; and step 10: inputting the obtained optimal fault-tolerant reference voltages $u_{dr}$, $u_{qr}$ and $u_{zr}$ into a carrier-based pulse width modulation (CPWM) module through the coordinate transformation to obtain switching signals of phases; and inputting the obtained switching signals of the phases into an inverter to control the five-phase permanent magnet motor, thereby realizing a short-circuit fault-tolerant control of the five-phase permanent magnet motor.

2. The short-circuit fault-tolerant control method based on the deadbeat current tracking for the five-phase permanent magnet motor with the sinusoidal back-EMF or the trapezoidal back-EMF according to claim 1, wherein in step 2, when the short-circuit fault occurs, an influence of a fault phase on the five-phase permanent magnet motor is divided into two aspects: an influence of a loss of the fault phase on a torque output and an influence of a fault phase short-circuit current on the torque output; and when the influence of the fault phase short-circuit current on the torque output is offset, a short-circuit fault model is equivalent to an open-circuit fault model.

3. The short-circuit fault-tolerant control method based on the deadbeat current tracking for the five-phase permanent magnet motor with the sinusoidal back-EMF or the trapezoidal back-EMF according to claim 1, wherein step 3 comprises: removing an element corresponding to a fault phase after a single-phase open-circuit fault occurs, and conducting a reconstruction based on a principle that a circular trajectory of a flux linkage and the back-EMF of the five-phase permanent magnet motor remains unchanged in an α-β plane after the single-phase open-circuit fault;

wherein, in case the five-phase permanent magnet motor with the sinusoidal back-EMF or the trapezoidal back-EMF has a phase-A open-circuit fault:

after an element corresponding to a phase A is removed, a matrix is obtained as follows:

$$T_{clarke}^A = \frac{2}{5}\begin{bmatrix} \cos\alpha & \cos2\alpha & \cos3\alpha & \cos4\alpha \\ \sin\alpha & \sin2\alpha & \sin3\alpha & \sin4\alpha \\ \cos3\alpha & \cos6\alpha & \cos9\alpha & \cos12\alpha \\ \sin3\alpha & \sin6\alpha & \sin9\alpha & \sin12\alpha \\ 1/2 & 1/2 & 1/2 & 1/2 \end{bmatrix}$$

wherein, $T_{clarke}^A$ is a clarke transformation matrix under the phase-A open-circuit fault, and α=0.4π;

in case of the phase-A open-circuit fault, a first row and a third row of elements of the clarke transformation matrix are not orthogonal; in order to obtain the reduced-order transformation matrix in the fundamental space, the third row of the elements of the clarke transformation matrix are removed; and based on the principle that the circular trajectory of the flux linkage and the back-EMF of the five-phase permanent magnet motor in the α-β plane-remains unchanged after the phase-A open-circuit fault, the clarke transformation matrix is reconstructed to obtain a reduced-order clarke transformation matrix and a reduced-order park transformation matrix in the fundamental space under the phase-A open-circuit fault:

$$T_{clake1}^A = \frac{2}{5}\begin{bmatrix} \cos a-1 & \cos2a-1 & \cos3a-1 & \cos4a-1 \\ \sin\alpha & \sin2\alpha & \sin3\alpha & \sin4\alpha \\ \sin3\alpha & \sin6\alpha & \sin9\alpha & \sin12\alpha \\ 1/2 & 1/2 & 1/2 & 1/2 \end{bmatrix}$$

$$T_{park1}^A = \begin{bmatrix} \cos\theta & \sin\theta & 0 & 0 \\ -\sin\theta & \cos\theta & 0 & 0 \\ 0 & 0 & 1 & 0 \\ 0 & 0 & 0 & 1 \end{bmatrix}$$

wherein, $T_{clarke1}^A$ is the reduced-order clarke transformation matrix in the fundamental space; $T_{park1}^A$ is the reduced-order park transformation matrix in the fundamental space; and θ is a position angle of a rotor;

in case of the phase-A open-circuit fault, the first row of the elements of the clarke transformation matrix and the third row of the elements of the clarke transformation matrix are not orthogonal; in order to obtain the reduced-order transformation matrix in the third harmonic space, the first row of the elements of the clarke transformation matrix are removed; and based on the principle that the circular trajectory of the flux linkage and the back-EMF of the five-phase permanent magnet motor in an $\alpha_3$-$\beta_3$ plane remains unchanged after the phase-A open-circuit fault, the clarke transformation matrix is reconstructed to obtain a reduced-order clarke transformation matrix and a reduced-order park transformation matrix in the third harmonic space under the phase-A open-circuit fault:

$$T_{clarke3}^A = \frac{2}{5}\begin{bmatrix} \cos3\alpha-1 & \cos6\alpha-1 & \cos9\alpha-1 & \cos12\alpha-1 \\ \sin3\alpha & \sin6\alpha & \sin9\alpha & \sin12\alpha \\ \sin\alpha & \sin2\alpha & \sin3\alpha & \sin4\alpha \\ 1/2 & 1/2 & 1/2 & 1/2 \end{bmatrix}$$

$$T_{park3}^A = \begin{bmatrix} \cos3\theta & \sin3\theta & 0 & 0 \\ -\sin3\theta & \cos3\theta & 0 & 0 \\ 0 & 0 & 1 & 0 \\ 0 & 0 & 0 & 1 \end{bmatrix}$$

wherein, $T_{clarke3}^A$ is the reduced-order clarke transformation matrix in the third harmonic space; and $T_{park3}^A$ is the reduced-order park transformation matrix in the third harmonic space.

4. The short-circuit fault-tolerant control method based on the deadbeat current tracking for the five-phase permanent magnet motor with the sinusoidal back-EMF or the trapezoidal back-EMF according to claim 1, wherein step 4 comprises:

ignoring, after the short-circuit fault occurs, the reluctance torque, and obtaining the torque expressions of the five-phase permanent magnet motor in the fundamental space and the third harmonic space through the reduced-order matrixes:

step 4.1: taking, for the five-phase permanent magnet motor with the trapezoidal back-EMF, a derivative of a magnetic co-energy to a mechanical angle in case of a constant current; and ignoring the reluctance torque, and obtaining the torque expressions of the five-phase permanent magnet motor in the fundamental space and the third harmonic space as follows:

$$T_{e1(Trapezoid)} = \frac{5P}{2}\{\psi_1 i_{q1} + 3\psi_3[0.5i_{d1}(\sin2\theta + \sin4\theta) - 0.5i_{q1}(\cos2\theta - \cos4\theta) + i_{z1}\cos3\theta]\}$$

$$T_{e3(Trapezoid)} = \frac{5P}{2}\{3\psi_3 i_{q3} + \psi_1[0.5i_{d3}(\sin4\theta - \sin2\theta) + 0.5i_{q3}(\cos4\theta - \cos2\theta) + i_{z3}\cos\theta]\}$$

wherein, $T_{e1(Trapezoid)}$ is a torque of the five-phase permanent magnet motor with the trapezoidal back-EMF in the fundamental space; $T_{e3(Trapezoid)}$ is a torque of the five-phase permanent magnet motor with the trapezoidal back-EMF in the third harmonic space; P is a number of pole pairs of the five-phase permanent magnet motor; $\Psi_1$ is an amplitude of a fundamental flux linkage; $\Psi_3$ is an amplitude of a third harmonic flux linkage; θ is a position angle of a rotor; $i_{d1}$ and $i_{q1}$ are $d_1$-$q_1$-axis currents in a fundamental rotating coordinate system; $i_{d3}$ and $i_{q3}$ are $d_3$-$q_3$-axis currents in a third harmonic rotating coordinate system; $i_{z1}$ is a generalized zero sequence component in the fundamental space; and $i_{z3}$ is a generalized zero sequence component in the third harmonic space; and step 4.2: taking, for the five-phase permanent magnet motor with the sinusoidal back-EMF, a derivative of a magnetic co-energy to a mechanical angle in case of a constant current; and ignoring the reluctance torque, and obtaining the torque expressions of the five-phase permanent magnet motor in the fundamental space and the third harmonic space as follows:

$$T_{e1(sin)} = \frac{5P}{2}\psi_1 i_{q1}$$

-continued $$T_{e3(sin)} = \frac{5P}{2}\psi_1[0.5i_{d3}(\sin4\theta - \sin2\theta) + 0.5i_{q3}(\cos4\theta - \cos2\theta) + i_{z3}\cos\theta]$$

wherein, $T_{e1(sin)}$ is a torque of the five-phase permanent magnet motor with the sinusoidal back-EMF in the fundamental space; and $T_{e3(sin)}$ is a torque of the five-phase permanent magnet motor with the sinusoidal back-EMF in the third harmonic space.

5. The short-circuit fault-tolerant control method based on the deadbeat current tracking for the five-phase permanent magnet motor with the sinusoidal back-EMF or the trapezoidal back-EMF according to claim 1, wherein in step 5, constructing, for the five-phase permanent magnet motor with the sinusoidal back-EMF or the trapezoidal back-EMF, the expression of the extra torque ripple generated by the interaction of the short-circuit current and the short-circuit back-EMF comprises:

step 5.1: for the five-phase permanent magnet motor with the trapezoidal back-EMF, ignoring the reluctance torque, and expressing a permanent magnet torque generated between the short-circuit current and the short-circuit back-EMF as follows:

$$T_{sc(Trapezoid)} = \frac{e_{a(Trapezoid)}i_{sc}P}{\omega} = -i_{sc}P[\psi_1\sin\theta + 3\psi_3\sin3\theta]$$

wherein, $T_{sc(Trapezoid)}$ is the extra torque ripple caused by the short-circuit current; $i_{sc}$ is the short-circuit current; $\omega$ is an electrical angular velocity of the five-phase permanent magnet motor, $\theta=\omega t$; and $e_{a(Trapezoid)}$ is a phase-A back-EMF of the five-phase permanent magnet motor with the trapezoidal back-EMF, $e_{a(Trapezoid)}$ is expressed as follows:

$$e_{a(Trapezoid)} = \frac{d[\psi_1\cos(\omega t) + \psi_3\cos(3\omega t)]}{dt} = -\omega\psi_1\sin(\omega t) - 3\omega\psi_3\sin(3\omega t)$$

step 5.2: for the five-phase permanent magnet motor with the sinusoidal back-EMF, ignoring the reluctance torque, and expressing a permanent magnet torque generated between the short-circuit current and the short-circuit back-EMF as follows:

$$T_{sc(sin)} = \frac{e_{a(sin)}i_{sc}P}{\omega} = -i_{sc}P\psi_1\sin\theta$$

wherein, $T_{sc(sin)}$ is the extra torque ripple caused by the short-circuit current; and $e_{a(sin)}$ is a phase-A back-EMF of the five-phase permanent magnet motor with the sinusoidal back-EMF, $e_{a(sin)}$ is expressed as follows:

$$e_{a(sin)} = \frac{d[\psi_1\cos(\omega t)]}{dt} = -\omega\psi_1\sin(\omega t).$$

6. The short-circuit fault-tolerant control method based on the deadbeat current tracking for the five-phase permanent magnet motor with the sinusoidal back-EMF or the trapezoidal back-EMF according to claim 1, wherein step 6 comprises:

generating, for the five-phase permanent magnet motor with the sinusoidal back-EMF or the trapezoidal back-EMF in case of the short-circuit fault, the short-circuit suppression currents to offset the extra torque ripple generated by the short-circuit current:

step 6.1: reasonably distributing, for the five-phase permanent magnet motor with the trapezoidal back-EMF, currents in synchronous rotating coordinate systems in the fundamental space and the third harmonic space to offset the extra torque ripple caused by the short-circuit current, wherein the short-circuit suppression currents are expressed as follows:

$$\begin{cases} i_{d1s(Trapezoid)} = 0.5939i_{sc}\cos(\theta) \\ i_{q1s(Trapezoid)} = 0.3878i_{sc}\sin(\theta) \\ i_{d3s(Trapezoid)} = -\frac{3\psi_3}{\psi_1}0.3878i_{sc}\cos(\theta) \\ i_{q3s(Trapezoid)} = -\frac{3\psi_3}{\psi_1}0.5939i_{sc}\sin(\theta) \\ i_{z1s(Trapezoid)} = 0 \\ i_{z3s(Trapezoid)} = 0 \end{cases}$$

wherein, $i_{d1s(Trapezoid)}$, $i_{q1s(Trapezoid)}$ and $i_{z1s(Trapezoid)}$ are short-circuit suppression currents on the $d_1$-$q_1$-$z_1$ axes in the synchronous rotating coordinate system in the fundamental space; and $i_{d3s(Trapezoid)}$, $i_{q3s(Trapezoid)}$ and $i_{z3s(Trapezoid)}$ are short-circuit suppression currents on the $d_3$-$q_3$-$z_3$ axes in the synchronous rotating coordinate system in the third harmonic space; and step 6.2: reasonably distributing, for the five-phase permanent magnet motor with the sinusoidal back-EMF, currents in a synchronous rotating coordinate system in the third harmonic space to offset the extra torque ripple generated by the short-circuit current, wherein the short-circuit suppression currents are expressed as follows:

$$\begin{cases} i_{d3s(sin)} = 0.4i_{sc}\cos3\theta \\ i_{q3s(sin)} = -0.4i_{sc}\sin3\theta \\ i_{z3s(sin)} = 0 \end{cases}$$

wherein, $i_{d3s(sin)}$, $i_{q3s(sin)}$ and $i_{z3s(sin)}$ are short-circuit suppression currents on the $d_3$-$q_3$-$z_3$ axes in the synchronous rotating coordinate system in the third harmonic space.

7. The short-circuit fault-tolerant control method based on the deadbeat current tracking for the five-phase permanent magnet motor with the sinusoidal back-EMF or the trapezoidal back-EMF according to claim 1, wherein step 7 comprises:

obtaining, for the five-phase permanent magnet motor with the sinusoidal back-EMF or the trapezoidal back-EMF in case of the short-circuit fault, the open-circuit fault-tolerant reference currents to maintain the smooth output torque, through the given q-axis current $i_q$, specifically by:

step 7.1: reasonably distributing, for the five-phase permanent magnet motor with the trapezoidal back-EMF, currents in synchronous rotating coordinate systems in the fundamental space and the third harmonic space to generate a torque equal to a torque before the short-circuit fault occurs and to suppress the extra torque ripple, wherein the open-circuit fault-tolerant reference currents are expressed as follows:

$$\begin{cases} i_{d1o(Trapezoid)} = 0, i_{d3o(Trapezoid)} = 0 \\ i_{q1o(Trapezoid)} = i_q, i_{q3o(Trapezoid)} = -\frac{3\psi_3}{\psi_1} i_{q1o(Trapezoid)} \\ i_{z1o(Trapezoid)} = 0.236 i_{q1o(Trapezoid)} \cos\theta \\ i_{z3o(Trapezoid)} = -\frac{3\psi_3}{\psi_1} i_{z1o(Trapezoid)} \frac{\cos 3\theta}{\cos\theta} \end{cases}$$

wherein, $i_{d1o(Trapezoid)}$, $i_{q1o(Trapezoid)}$ and $i_{z1o(Trapezoid)}$ are open-circuit fault-tolerant reference currents on the $d_1$-$q_1$-$z_1$ axes in the synchronous rotating coordinate system in the fundamental space; and $i_{d3o(Trapezoid)}$, $i_{q3o(Trapezoid)}$ and $i_{z3o(Trapezoid)}$ are open-circuit fault-tolerant reference currents on the $d_3$-$q_3$-$z_3$ axes in the synchronous rotating coordinate system in the third harmonic space; and step 7.2: reasonably distributing, for the five-phase permanent magnet motor with the sinusoidal back-EMF, currents in a synchronous rotating coordinate system in the fundamental space to generate a torque equal to a torque before the short-circuit fault occurs, wherein the open-circuit fault-tolerant reference currents are expressed as follows:

$$\begin{cases} i_{d1o(sin)} = 0 \\ i_{q1o(sin)} = i_q \\ i_{z1o(sin)} = 0.236 i_{q1o(sin)} \cos\theta \end{cases}$$

wherein, $i_{d1o(sin)}$, $i_{q1o(sin)}$ and $i_{z1o(sin)}$ are open-circuit fault-tolerant reference currents on the $d_1$-$q_1$-$z_1$ axes in the synchronous rotating coordinate system in the fundamental space.

8. The short-circuit fault-tolerant control method based on the deadbeat current tracking for the five-phase permanent magnet motor with the sinusoidal back-EMF or the trapezoidal back-EMF according to claim 1, wherein step 9 comprises:

obtaining the optimal fault-tolerant reference voltages $u_{dr}$, $u_{qr}$ and $u_{zr}$ under the short-circuit fault through the deadbeat model predictive current control, wherein the discrete model required by the deadbeat model predictive current control under the short-circuit fault is constructed by step 9.1: obtaining a stator voltage equation for the five-phase permanent magnet motor with the trapezoidal back-EMF in case of the single-phase open-circuit fault:

$$\begin{cases} u_d = R_s i_d - \omega L_q i_q + L_d \frac{di_d}{dt} \\ u_q = R_s i_q + \omega L_d i_d + L_q \frac{di_q}{dt} + \omega\psi_1 \\ u_z = R_s i_z + L_s \frac{di_z}{dt} + 3\omega\psi_3 \cos(3\theta) \end{cases}$$

wherein, $L_d$, $L_q$, $L_s$ are inductance components of axes in a rotating coordinate system in the fundamental space; $R_s$ is a stator resistance; $\theta$ is a position angle of a rotor; $\omega$ is an electrical angular velocity of the five-phase permanent magnet motor; $u_d$, $u_q$ and $u_z$ are voltage components on the $d_1$-$q_1$-$z_1$ axes in the synchronous rotating coordinate system in the fundamental space; $i_d$, $i_q$ and $i_z$ are current components on the $d_1$-$q_1$-$z_1$ axes in the synchronous rotating coordinate system in the fundamental space; $\Psi_1$ is an amplitude of a fundamental flux linkage; and $\Psi_3$ is an amplitude of a third harmonic flux linkage;

step 9.2: transforming, for the five-phase permanent magnet motor with the trapezoidal back-EMF, the continuous stator voltage equation into a discrete equation through a forward Euler discretization:

$$\begin{cases} i_d(k+1) = \left(1 - \frac{R_s T_s}{L_d}\right) i_d(k) + \omega \frac{L_q T_s}{L_d} i_q(k) + \frac{T_s}{L_d} u_d(k) \\ i_q(k+1) = -\omega \frac{L_d T_s}{L_q} i_d(k) + \left(1 - \frac{R_s T_s}{L_q}\right) i_q(k) + \frac{T_s}{L_q} u_q(k) - \frac{\omega\psi_1 T_s}{L_q} \\ i_z(k+1) = \left(1 - \frac{R_s T_s}{L_s}\right) i_z(k) + \frac{T_s}{L_s} u_z(k) - \frac{3\omega\psi_3 \cos(3\theta) T_s}{L_s} \end{cases}$$

wherein, $T_s$ is a sampling time; $i_d(k)$, $i_q(k)$ and $i_z(k)$ are current components on the $d_1$-$q_1$-$z_1$ axes in the synchronous rotating coordinate system in the fundamental space at a current time; $i_d(k+1)$, $i_q(k+1)$ and $i_z(k+1)$ are current components on the $d_1$-$q_1$-$z_1$ axes in the synchronous rotating coordinate system in the fundamental space at a next time; $u_d(k)$, $u_q(k)$ and $u_z(k)$ are voltage components on the $d_1$-$q_1$-$z_1$ axes in the synchronous rotating coordinate system in the fundamental space at the current time;

step 9.3: setting, for the five-phase permanent magnet motor with the trapezoidal back-EMF, currents at the next time be equal to the optimal short-circuit fault-tolerant reference currents, and combining currents obtained in a current sampling period, to obtain optimal short-circuit fault-tolerant voltages required at the current time, written in a form of a matrix as follows:

$$\begin{bmatrix} u_{dr} \\ u_{qr} \\ u_{zr} \end{bmatrix} = \begin{bmatrix} R_s - \frac{L_d}{T_s} & -\omega L_q & 0 \\ \omega L_d & R_s - \frac{L_q}{T_s} & 0 \\ 0 & 0 & R_s - \frac{L_s}{T_s} \end{bmatrix} \begin{bmatrix} i_d(k) \\ i_q(k) \\ i_z(k) \end{bmatrix} +$$

$$\begin{bmatrix} \frac{L_d}{T_s} & 0 & 0 \\ 0 & \frac{L_q}{T_s} & 0 \\ 0 & 0 & \frac{L_s}{T_s} \end{bmatrix} \begin{bmatrix} i_{dr} \\ i_{qr} \\ i_{zr} \end{bmatrix} + \begin{bmatrix} 0 \\ \omega\psi_1 \\ 3\omega\psi_3 \cos 3\theta \end{bmatrix}$$

step 9.4: setting $\Psi_3$ in the matrix expression of the optimal short-circuit fault-tolerant voltages to be zero to obtain a matrix expression of the optimal short-circuit fault-tolerant voltages for the five-phase permanent magnet motor with the sinusoidal back-EMF as follows:

$$\begin{bmatrix} u_{dr} \\ u_{qr} \\ u_{zr} \end{bmatrix} = \begin{bmatrix} R_s - \frac{L_d}{T_s} & -\omega L_q & 0 \\ \omega L_d & R_s - \frac{L_q}{T_s} & 0 \\ 0 & 0 & R_s - \frac{L_s}{T_s} \end{bmatrix} \begin{bmatrix} i_d(k) \\ i_q(k) \\ i_z(k) \end{bmatrix} +$$

$$\begin{bmatrix} \frac{L_d}{T_s} & 0 & 0 \\ 0 & \frac{L_q}{T_s} & 0 \\ 0 & 0 & \frac{L_s}{T_s} \end{bmatrix} \begin{bmatrix} i_{dr} \\ i_{qr} \\ i_{zr} \end{bmatrix} + \begin{bmatrix} 0 \\ \omega\psi_1 \\ 0 \end{bmatrix}.$$

* * * * *